(Specimens.)

R. B. LOYND.
ART OF MANUFACTURING WILTON AND MOQUETTE CARPETS.

No. 436,529.  Patented Sept. 16, 1890.

WITNESSES:
Wm. L. Chase
Chas. T. Fletcher

INVENTOR,
Richard B. Loynd
BY John C. Dewey
ATTORNEY.

UNITED STATES PATENT OFFICE.

RICHARD B. LOYND, OF WORCESTER, MASSACHUSETTS.

ART OF MANUFACTURING WILTON AND MOQUETTE CARPETS.

SPECIFICATION forming part of Letters Patent No. 436,529, dated September 16, 1890.

Application filed February 23, 1889. Serial No. 300,797. (Specimens.)

*To all whom it may concern:*

Be it known that I, RICHARD B. LOYND, a citizen of the United States, residing at Worcester, in the county of Worcester and State of Massachusetts, have invented certain new and useful Improvements in the Art of Manufacturing Wilton and Moquette Carpets; and I do hereby declare that the following is a full, clear, and exact description thereof, which, in connection with the drawings making a part of this specification, will enable others skilled in the art to which my invention belongs, to make and use the same.

My invention relates to the manufacture of "Wilton" and "Moquette" carpets, so called; and the object of my invention is to manufacture a Wilton and a Moquette carpet, both at the same time, and at one operation on the same loom, and also to make a Moquette carpet of much finer texture than is made at the present time.

My invention consists in the improved art or method of manufacturing Wilton and Moquette carpets, as will be hereinafter fully described, and the nature thereof indicated by the claim.

In my improved method I dispense entirely with the wires ordinarily used in making a Wilton carpet, and I dispense with the tuft-needles used in making a Moquette carpet, and I produce simultaneously on the same loom a Wilton carpet and a Moquette carpet—that is, two carpets of different structures and two different textile materials—in the manner to be hereinafter fully described.

Figure 1:
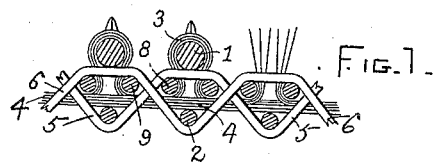
Figure 2:
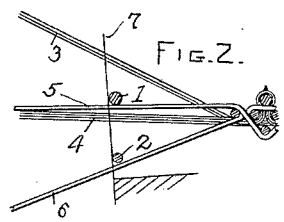
Figure 3:
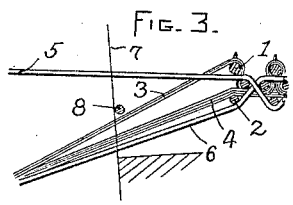
Figure 4:
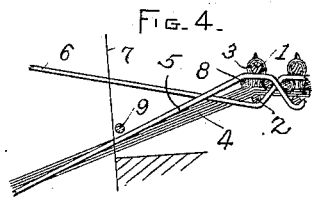
Figure 5:
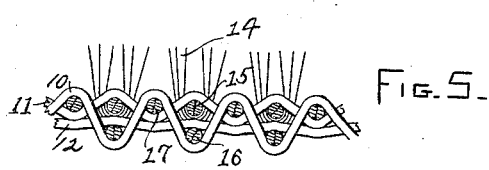
Figure 6:
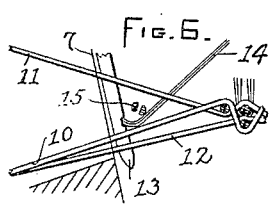
Figure 7:
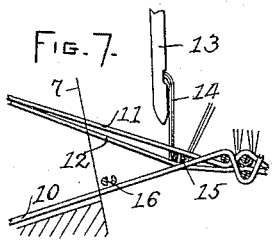
Figure 8:
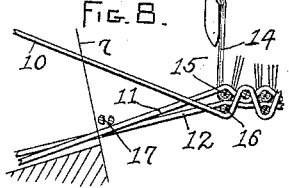
Figure 9:
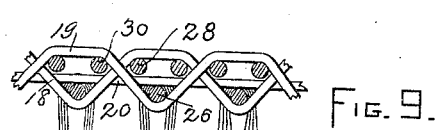
Figure 10:
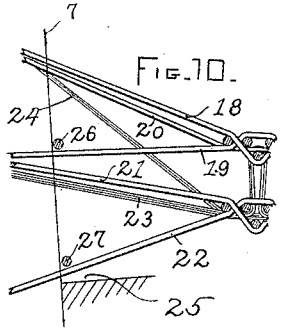
Figure 11:
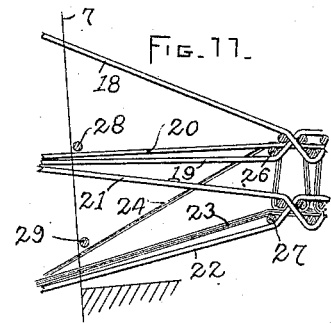
Figure 12:
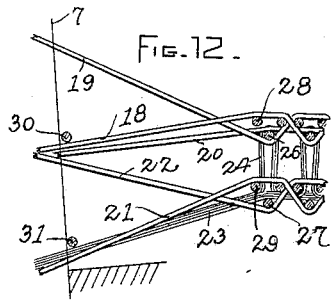

Referring to the drawings, Figure 1 represents in sectional elevation the elements of a Wilton carpet made by the old method with wires. Figs. 2, 3, and 4 represent the position of the warp-threads in the successive sheds in making said Wilton carpet. Fig. 5 represents in sectional elevation the elements of a Moquette carpet made by the old method with tuft-needles. Figs. 6, 7, and 8 represent the position of the warp-threads and tuft-needles in the successive sheds used in making said Moquette carpet. Fig. 9 represents the double Wilton and Moquette carpet not completely cut apart manufactured by my improved method. Figs. 10, 11, and 12 represent the position of warp-threads in the successive sheds used in making the double Wilton and Moquette carpet shown in Fig. 9 on a double-shuttle loom.

In all Wilton and Moquette carpets the general structure is the same—that is, the tufts are put in in straight rows in the direction of the warp, and between each two rows of tufts is put a series of warp-threads, so interwoven with the filling as to form the backing which holds the tufts.

In each figure of the drawings I have represented the backing-warp threads in a single series, and beyond them one row of tufts.

A Wilton carpet is a cut-pile fabric, in which all the tuft-yarn used in it is carried in the body of the cloth as warp. Several colors or shades of the tuft-yarn are drawn into each dent in the reed, any one of which, by means of a jacquard, may be raised from the others to form the tuft on the given pick, the rest of the tuft-yarn going in "dead" in the space under the row of tufts and between two series of backing-warps.

Heretofore Wilton carpets have been made by inserting a wire in the shed over which the tuft-yarn is folded, and by the withdrawal of which the tuft is cut. Fig. 2 represents the wire pick in this weave, in which, and also in Fig. 1, the part marked 1 is the wire, and 2 a shot of filling which goes into a shed formed below the wire-shed simultaneously with the wire 1. The part marked 3 is the shade of tuft-yarn raised to form the tuft, and 4 the body of the tuft-yarn. There are here two backing-warps, one of which is represented by 5 and the other by 6. The part marked 7 represents the face of the reed partly beaten up.

Fig. 3 represents the shed for the succeeding pick of filling 8, in which all the tuft-yarn goes into the bottom line of the shed, the back warp remaining, as in Fig. 2.

Fig. 4 is the shed for the second pick of filling 9, succeeding the wire, in which all the tuft-yarn remains at the bottom and the back warps have been shifted. Yarn for another tuft being lifted, the operation is repeated. Each wire 1 is provided on one end with a knife or cutting projection, so that when a sufficient number of wires have been bound in to make firm cloth and a given wire is withdrawn through the loop, the pile is cut, as shown at the right in Fig. 1.

A Moquette carpet is a cut-pile fabric, in which none of the tuft-yarn is carried in the body of the cloth as warp.

Heretofore Moquette carpets have been made by inserting the tuft-yarn by means of needles. Fig. 6 represents the tuft-pick in this weave, in which 7 is the face of the reed. There are here two pairs of backing-warps, one of which is represented by 10 and the other pair by 11, and also a fifth warp-thread 12, called the "stuffer." 13 is a tuft-needle, which is dropped into the space in front of the reed, between two series of back-warps, and 14 is the tuft-yarn carried by it.

In order to avoid wear on the needles and avoid carrying the needles too great a distance when dropping them into the warp-spaces, and also other troubles incident to the use of a shuttle for putting in the filling, the filling is here inserted by means of a filling-needle, which carries across one strand of filling, when it is looped about a selvage shuttle-thread, and the needle returns, leaving a double filling 15 in the space between the tuft-yarn and upper back-warp thread. The tuft-needle is partially withdrawn, the lay beaten up to a point a little short of the regular beat, and the stuffer lifted from the bottom to the top line of the shed, when pick 16 of the filling, Fig. 7, is put in, and both picks 15 and 16 beaten home together, by which pick 16 is carried into the cloth immediately underneath 15, as seen in Fig. 5. The stuffer 12 now goes down, and pairs 10 and 11 of the back-warp are shifted, when pick 17 of filling, Fig. 8, is put in and beaten home, when the tuft 14 is cut, releasing needle 13 and allowing it to be taken away to make room for the needle carrying the next tuft to be inserted, which may be a different one, according to the demands of the pattern. The back-warp threads are shifted to positions shown in Fig. 6, another tuft-needle inserted, and the operation may be repeated.

The most common form of Moquette weave has four shots of filling to each tuft; but as the method of making it is similar to the somewhat simpler form above described, I have not deemed it necessary to show it in the drawings.

Having described the old method of manufacturing Wilton and Moquette carpets, I will now proceed to describe my improved method.

In Fig. 10, 18 and 19 are a pair of back-warp threads, and 20 is the stuffer back-warp thread of the Moquette carpet, which I have here represented as being the top piece of fabric in the double fabric shown. 21 and 22 are a pair of back-warp threads similar to 5 and 6, Fig. 2, in the Wilton carpet made with wires, and which are here worked in the lower piece of fabric in the double fabric, which is the Wilton carpet. 23 is the body of the tuft-yarn carried in the Wilton carpet, and 24 the shade of yarn lifted to make the tuft. The sheds represented in Fig. 10 correspond to the wire pick-shed, Fig. 2, and are here supposed to be in a double-shuttle loom, in which a shuttle is sent through both sheds at the same time, the shuttle in the Wilton carpet going across on the race 25 and the shuttle in the Moquette carpet going across on the bottom warps of the top fabric. The face of reed 7 is here shown as partly beaten up. Picks of filling 26 and 27 being beaten home, the warps are shifted to the position shown in Fig. 11, in which warps 18 and 19 of the top fabrics remain as in Fig. 10, while stuffer 20 goes down to the bottom of the top shed. Warps 21 and 22 remain as in Fig. 10, while the body of tuft-yarn 23 and the tuft shade 24 are both carried to the bottom line of the bottom shed. Picks of filling 28 and 29 are now put in and beaten home and the warps shifted to the position shown in Fig. 12, in which stuffer 20 in the top fabric remains as in Fig. 11, 18 and 19 being shifted. Warps 21 and 22 in the lower fabric have been shifted and the body of tuft-yarn remains as in Fig. 11. The beating in of filling 29 has carried the tuft shade 24 back into the body of tuft-yarn, thus completing the double loop of tuft over the shot of filling 26, which takes the place of the wire in Figs. 1 to 4. Picks of filling 30 and 31 are now put in and beaten home, after which stuffer 20 and another shade of tuft-yarn are raised, as in Fig. 10, and the operation may be repeated.

My method could be worked in a single shuttle-loom, except that cutting the filling-thread where it passes from one fabric to the other would make rather a weak selvage for carpets.

In manufacturing a Wilton and a Moquette carpet by my method I do not limit myself to the precise weave above described, as it can be considerably modified without departing from the principle of my invention.

I am aware that prior to my invention a patent has been granted presenting a method of weaving two carpets at the same time as a double pile fabric; but there is a material structural difference between the double fabric shown and described in said patent and the double fabric made by my method, as described herein. In the patent referred to the shade of pile warp-yarn selected is raised and bound into the upper of the two fabrics, which upper fabric is a two-shot fabric around a pick of filling, then returned to be bound into the lower fabric, which lower fabric is a four-shot fabric around a pick of filling, again raised and bound into the upper fabric by a pick of filling, and then returned to the lower fabric to be bound and carried therein as warp. In my method the shade of pile warp-yarn selected is raised and bound into the upper fabric, which is a three-shot fabric around a pick of filling, and then returned to be bound and carried as warp in the lower fabric, which is also a three-shot fabric.

From the above it will be apparent to those skilled in the art that in the double fabric shown in the patent referred to the pile warps or tufts are doubled, presenting four ends to each spot, thus lengthening the figure and making it twice the length of the figure in my fabric, in which the pile warps or tufts are carried up and down but once, presenting but two ends.

Having thus described my invention, what I claim as new, and desire to secure by Letters Patent, is—

The improved method of manufacturing Wilton and Moquette carpets, which consists in first making a double pile fabric composed of two sets of ground-warps, a set of figuring pile-warps, and weft or filling threads by interweaving the weft or filling threads with the ground-warps to form two ground or foundation fabrics, binding the pile-warps ordinarily as warp into one of the ground or foundation fabrics, and for each transverse line of pile-tufts to appear in the completed fabrics selecting certain shades of the pile warp-yarns, carrying them to the other foundation-fabric, binding them therein by the filling, and immediately returning them to the first fabric, binding them therein as warp until again required to appear in the pattern or figure, and then separating the double pile fabric thus produced by severing the connecting portions of the pile-yarns, substantially as set forth.

RICHARD B. LOYND.

Witnesses:
JOHN C. DEWEY,
HENRY H. YOUNG.